United States Patent [19]

Watkins et al.

[11] Patent Number: 4,878,551
[45] Date of Patent: Nov. 7, 1989

[54] LADLE TRANSFER CAR WITH WEIGHING SYSTEM

[75] Inventors: Donald M. Watkins, Beloit; Tryon V. Huggett, Chagrin Falls; Judson F. Martt, Youngstown, all of Ohio

[73] Assignee: Steel Equipment Specialists, Inc., Alliance, Ohio

[21] Appl. No.: 273,357

[22] Filed: Nov. 18, 1988

[51] Int. Cl.$^4$ .......................... G01G 19/08; G01G 3/14
[52] U.S. Cl. ..................................... 177/139; 177/211
[58] Field of Search .......................... 177/139, 211, 255

[56] References Cited

U.S. PATENT DOCUMENTS 3,858,672  1/1975  Mrozek et al. ...................... 177/136

Primary Examiner—George H. Miller, Jr.
Attorney, Agent, or Firm—Calfee, Halter & Griswold

[57] ABSTRACT

An improved ladle transfer car for transporting ladles and providing accurate and consistent weight measurements for the ladle and its contents. In a preferred embodiment the ladle transfer car comprises a car body supported upon multiple truck assemblies. Connecting each of the truck assemblies to the car body is a shear beam load cell pin. Associated with each of the truck assemblies is a stabilizer assembly. The stabilizer assemblies permit the vertical movement of the car body relative to the truck assemblies and they help to prevent the horizontal movement of the car body relative to the truck assemblies. Each of the stabilizer assemblies includes a pivot arm which extends substantially perpendicular to the major axis of the truck assemblies. The pivot arm is pivotally connected at one end of the car body and pivotally connected at the other end to a respective truck assembly. Mounted in the immediate proximity of each of the shear beam load cell pins is a keeper assembly. The keeper assemblies comprise a keeper plate having a pair of threaded openings therein. Jacking bolts are threaded through the openings until the ends of the bolts contact and securely engage the outer diameter of the shear beam load cell pin. The keeper assemblies prevent the rotation of the shear beam load cell pins thereby helping to ensure the proper alignment of the pins relative to the load.

12 Claims, 5 Drawing Sheets

LADLE TRANSFER CAR WITH WEIGHING SYSTEM

DISCLOSURE OF THE INVENTION

This invention relates to a ladle transfer car for transporting ladles of molten metal from one location to another in a metal melting facility. More particularly, this invention relates to an improved ladle transfercar which, in addition to being capable of transporting a ladle, is also capable of providing accurate and consistent weight measurements for the ladle and its contents.

BACKGROUND

Ladle transfer cars have been utilized in the metals industry for many years. In steelmaking operations, ladle transfer cars are commonly used in basic oxygen furnace shops to transport ladles full of molten steel from the furnace area to the teeming aisle or pouring area. More particularly, in many basic oxygen furnace shops molten steel is poured from the furnace into a ladle that is positioned beneath the furnace upon a ladle transfer car. The transfer car rides along a pair of rails which are mounted along the floor of the furnace shop. The rails extend from beneath the furnace to the pouring area. After the molten metal is emptied from the furnace into the ladle, the transfer car rides along the rails transporting the ladle from beneath the furnace to the pouring area. When the transfer car arrives in the pouring area, the ladle is removed from the transfer car by an overhead crane and the pouring operation is commenced. Upon completion of the pouring operation, the empty ladle is placed back onto the transfer car and the ladle is transported by the transfer car back beneath the furnace.

Determining the weight of the molten metal which is poured from the furnace and contained in the ladle is important to both the quality and overall efficiency of the steelmaking operation. Specifically, the weight of the molten metal must be known in order to ensure that proper alloy additions are made to the ladle. Improper ladle additions can lead to the scrapping or rejection of an entire heat of up to 300 tons of steel. Also, knowing the weight of the molten metal helps to ensure that the proper amount of metal is poured into the individual molds that comprise a drag or series of molds thereby helping to prevent the pouring of the last or trailer mold of a drag to an insufficient height. The pouring of the last mold to an insufficient height often results in the ingot associated with the mold being rejected or scrapped. If the weight of the molten metal is known prior to beginning the pouring operation, and it is determined that there will be insufficient metal left in the ladle to pour the last mold, any molten metal left in the ladle after the pouring of the second to last mold on a drag may merely be poured back into the furnace and recycled thereby avoiding the cost of reheating the metal and other related production expenses.

Various attempts have been made in the prior art to provide ladle transfer cars with weighing systems. Some of these prior art ladle transfer cars have included the use of shear beam load cell pins. These pins connect the car body of the transfer car to the various truck assemblies which support the car body upon the rails. Each of the pins includes strain gauges which generate an electrical signal corresponding to the weight supported by the pins. The pins are electrically connected through a summing box to a weigh instrument which converts the electrical signal transmitted from the pins to a weight.

Unfortunately, prior art ladle transfer cars with weighing systems have been found to produce inaccurate and unreliable weights. This may be due in part to the extraordinarily harsh environment in which the ladle transfer cars must operate. More particularly, molten metal is sometimes spilled on the transfer cars and the cars continually experience shock loading and horizontal loads as a result of the rough handling of the ladles (which can weigh over 300 tons when full) by overhead cranes which lift and set the ladles upon the transfer cars.

SUMMARY OF THE INVENTION

The present invention provides an improved ladle transfer car having a weighing system that facilitates the accurate and consistent weighing of a ladle and its contents. The improved transfer car and its weighing system are better equipped to withstand the extremely harsh environment of a basic oxygen furnace shop. Specifically, the weighing system of the transfer car is better equipped to withstand adverse loading conditions including the mishandling of the ladle by overhead cranes. Crane mishandling includes shock loading, horizontal loads and the accidental spillage of molten metal and slag upon the rails. The spillage of molten metal and slag upon the rails creates a rough surface upon which the transfer car must travel. A rough traveling surface can result in the undue vibration of the transfer car and the continual and excessive shifting of loads and forces throughout the structure of the transfer car.

A transfer car made in accordance with the present invention includes a keeper assembly mounted in the immediate proximity of each of the shear beam load cell pins. Each keeper assembly includes a keeper plate mounted to the car assembly and a pair of jacking bolts which are threaded through the keeper plate. The ends of the jacking bolts contact and securely engage the outer diameter of the pin. The keeper assemblies serve to prevent the rotational movement of the shear beam load cell pins thereby helping to ensure the proper alignment of the pins and more accurate and consistent weight measurements.

An improved ladle transfer car made in accordance with the present invention also includes multiple stabilizer assemblies. More particularly, a stabilizer assembly is associated with each of the truck assemblies of the ladle transfer car. Each stabilizer assembly includes a first pair of gussets which form a clevis upon the truck assembly and a second pair of gussets which form a clevis upon the frame of the car body. Spanning between each gusset that comprises a gusset pair is a cylindrical pin. Connecting each of the pins is a pivot arm which is capable of pivoting relative to the pins. The stabilizer assemblies allow the car body to move vertically relative to the truck assembly but they help to prevent the lateral horizontal movement of the car body relative to the truck assemblies.

With the keeper assemblies and stabilizer assemblies the transfer car is better able to provide accurate and consistent weight measurements when exposed to adverse loading conditions such as shock loading, horizontal loads and rough rails. More particularly, the keeper assemblies help to prevent the shear beam load cell pins from moving or rotating as a result of adverse loading conditions. Also, the stabilizer assemblies serve to limit the lateral horizontal movement of the car body relative to the truck assembly upon exposure to adverse loading conditions thereby helping to prevent the car body from shifting relative to the truck assemblies. Such shifting can result in the car body and truck assemblies rubbing against each other and creating frictional losses that lead to inaccurate weight measurements.

The weighing system provided by the present invention may be incorporated into both new and pre-existing ladle transfer cars. A pre-existing ladle transfer car may be modified or updated to include the weighing system of the present invention merely by mounting the required number of stabilizer assemblies and keeper assemblies upon the pre-existing ladle transfer car.

The foregoing and other features of the invention are hereinafter more fully described and particularly pointed out in the claims, the following detailed description and the annexed drawings setting forth in detail a certain illustrated embodiment of the invention, this being indicative, however, of but one of the various ways in which the principles of the invention may be employed.

BRIEF DESCRIPTION OF THE DRAWINGS

In the annexed drawings.

DETAILED DESCRIPTION OF THE PREFERRED EMBODIMENT

Figure 1:
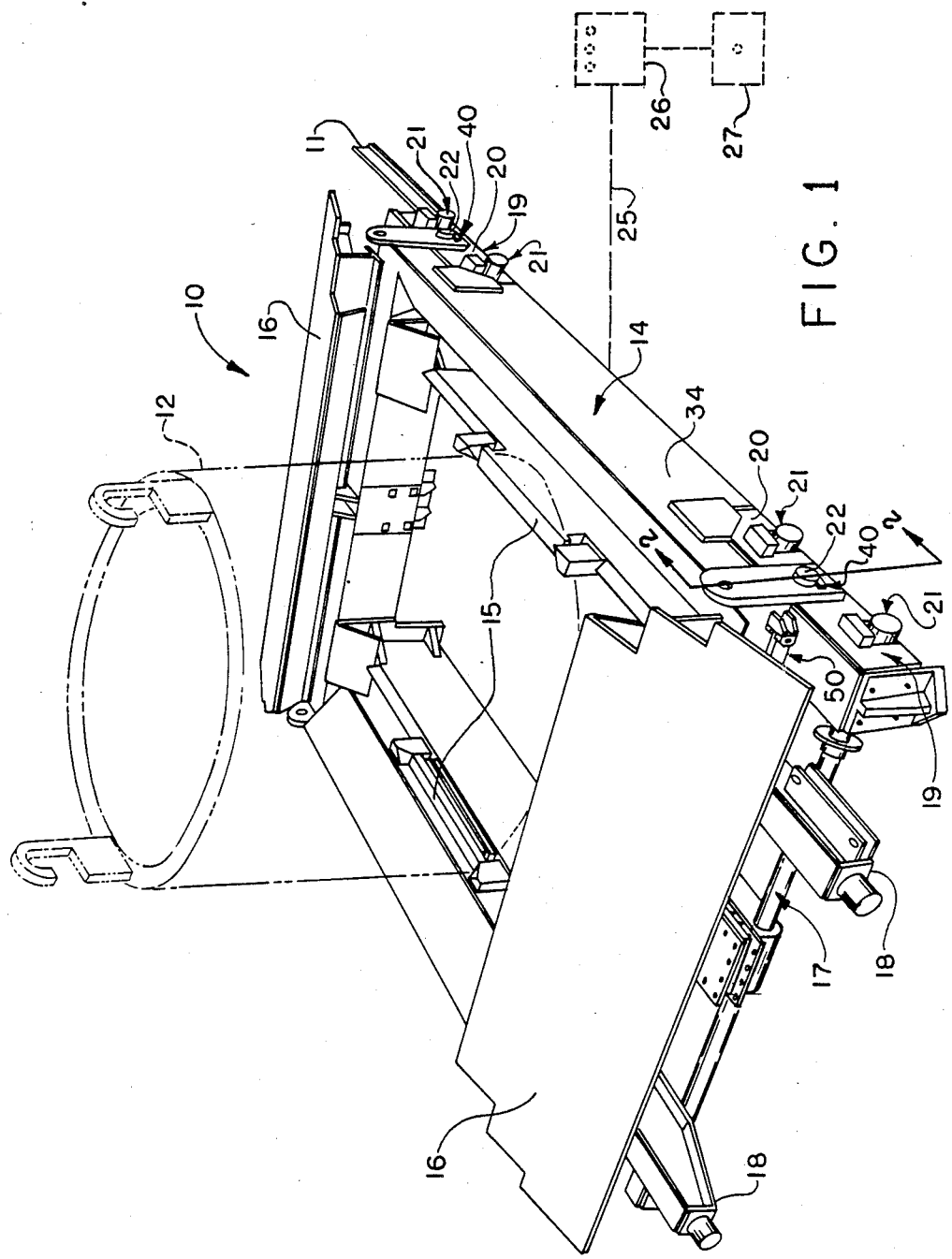
FIG. 1 is a pictorial perspective illustration of a ladle transfer car made in accordance with the present invention.

Referring to the drawings and initially to FIG. 1 there is illustrated a ladle transfer car, indicated generally at 10, made in accordance with the present invention. Transfer car 10 rides along rails 11 and is utilized to transfer a ladle 12 (shown in phantom) or other like containers of molten metal from one location to another in a metal melting facility such as a basic oxygen furnace shop.

The transfer car 10 comprises a car body, indicated generally at 14, including a platform 15 upon which the ladle sets, slag deflector shields 16 for preventing the molten metal from being spilled onto the drive mechanisms 17, and bumpers 18 for protecting the transfer car 10 from being damaged in the event it should strike a wall or other immovable object. The car body 14 is supported at each of its four corners by truck assemblies 19. Each truck assembly 19 includes an open bottom rectangular frame or housing, indicated generally at 20, supported at each of its ends by a wheel assembly 21 which rides upon rails 11. Connecting each of the truck assemblies 19 to the car body 14 is a shear beam load cell pin 22.

Figure 2:
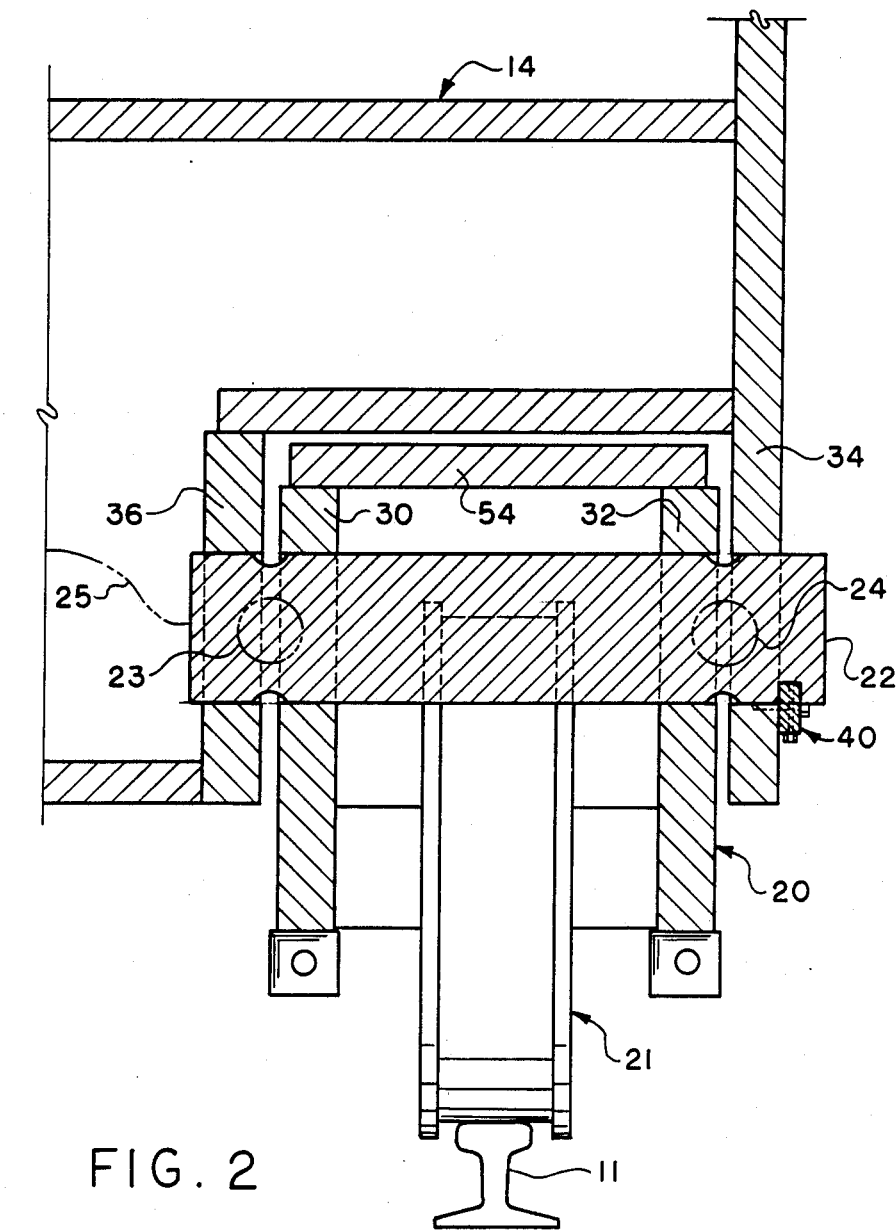
FIG. 2 is a fragmentary cross-sectional view of the car body, truck assembly and shear beam load cell pin taken generally along the plane 2—2 of FIG. 1 with portions removed.
Figure 3:
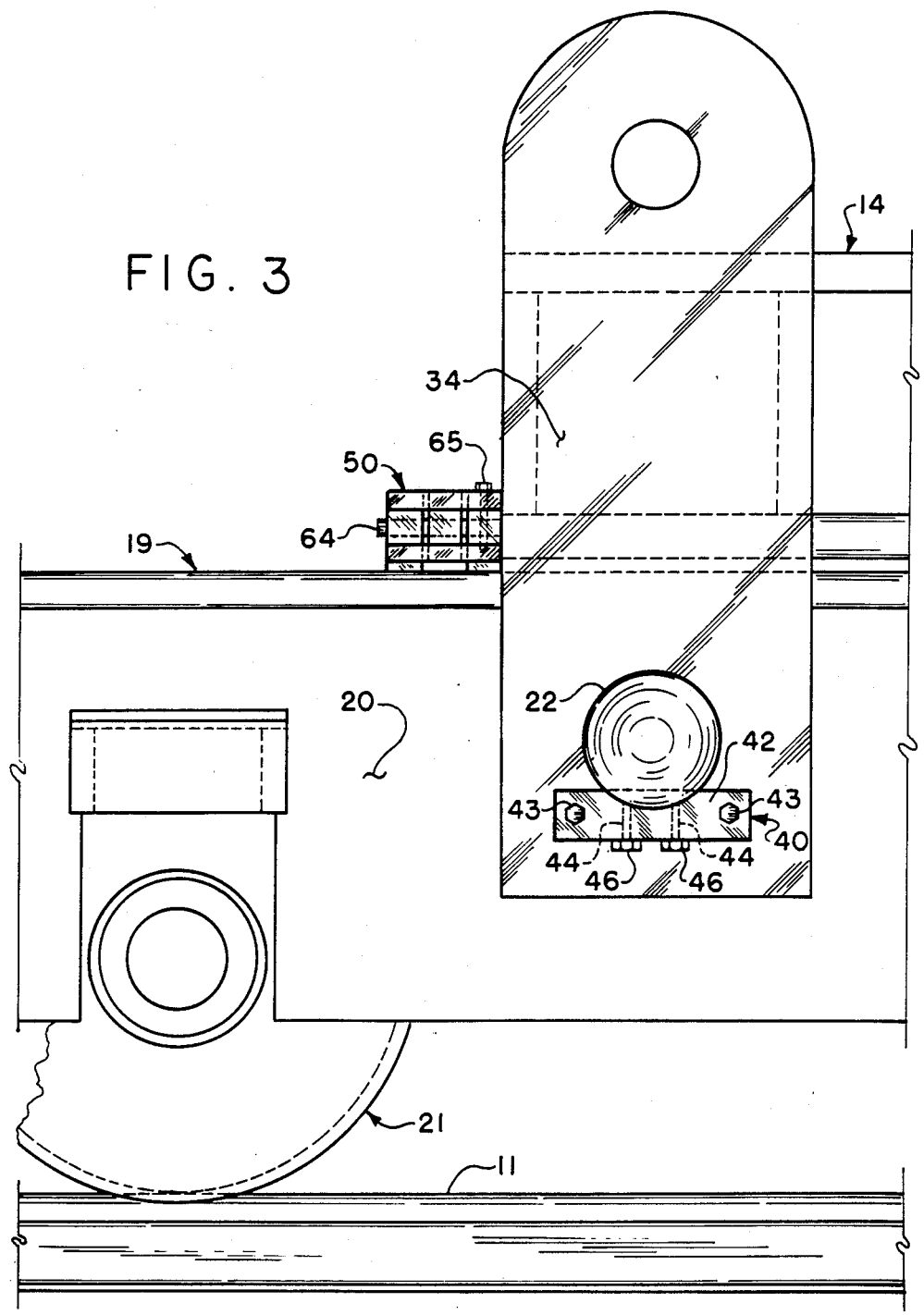
FIG. 3 is a fragmentary side elevational view of the car body, shear beam load cell pin and truck assembly of FIG. 2.
Figure 4:
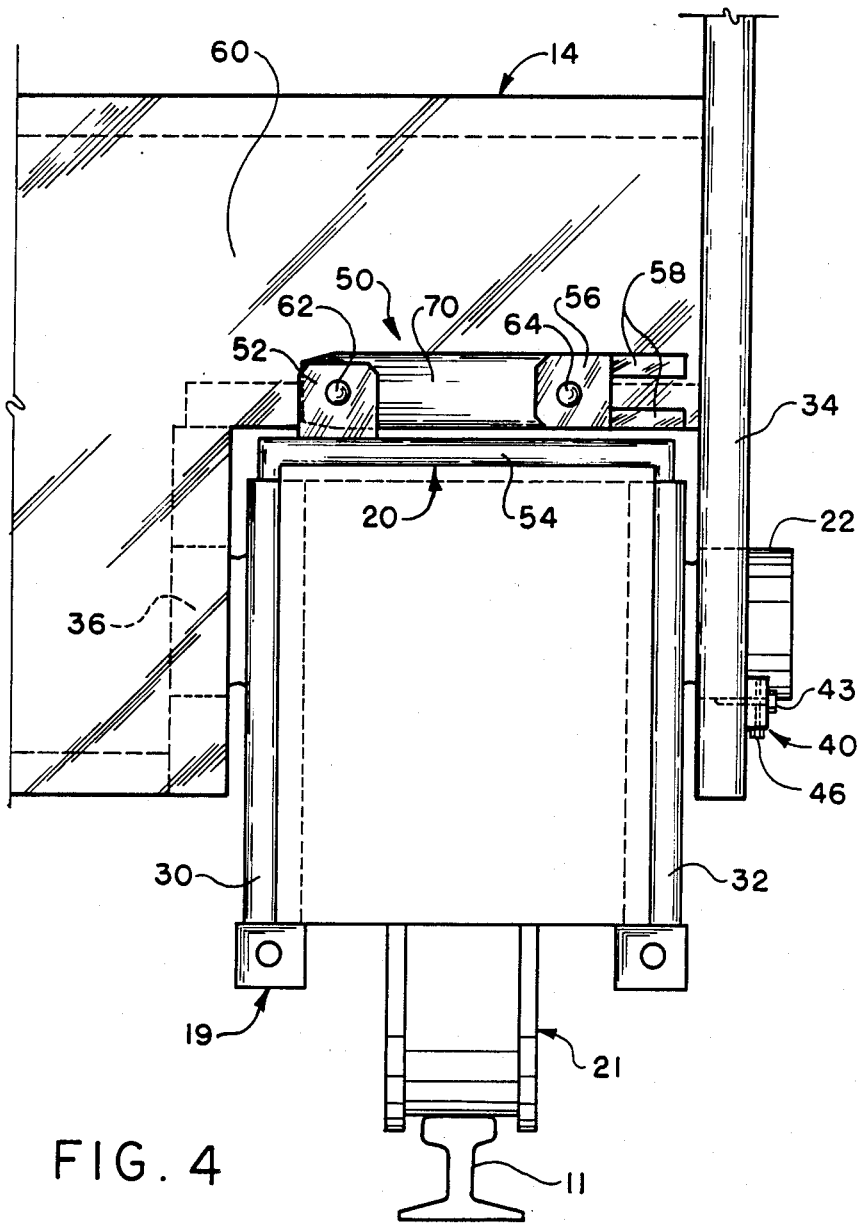
FIG. 4 is a fragmentary end elevational view of the car body, shear beam load cell pin and truck assembly of FIG. 2.

Referring now additionally to FIGS. 2-4, the shear beam load cell pins 22 and their relationship to the car body 14 and truck assemblies 19 is more clearly illustrated. More particularly, the shear beam load cell pin 22 extends through the inner 30 and outer 32 walls of the truck frame 20 and through the outer wall 34 and recessed inner wall 36 of the car body 14. Preferably, the shear beam load cell pin 22 includes a marking or identification (not shown) thereon which facilitates the installation of the pin 22 at the proper orientation relative to the load. A shear beam load cell pin suitable for use in the present invention is a double shear beam load cell pin which is produced by first machining a piece of steel to the configuration of a pin which is capable of fitting securely within the openings in the inner 30 and outer 32 walls of the truck frame 20 and the outer wall 34 and inner wall 36 of the car body 14. After the pin is machined to its general configuration, multiple strain gauges are mounted upon the pin in the proximity of where the pin contacts wall 30, 32 and walls 34, 36. More particularly, the location for mounting the strain gauges is generally indicated in FIG. 2 at locations 23 and 24.

The shear beam load cell pins 22 are electrically connected by cables and wiring 25 (schematically shown) to a summing box 26 (schematically shown) such as, for example, a multi-transducer summing unit which is available from BLH Electronics of Waltham, Mass. Such a summing box is capable of receiving electrical impulses from the shear beam load cell pins 22 and transmitting a summed signal to an electronic weigh intrument 27 (schematically shown) capable of calculating a weight. An example of an electronic weight instrument suitable for use with the present invention is a digital weigh instrument sold under the trademark DOMINATOR 738 by Cardinal of Webb City, Mo. Upon proper calibration which negates the weight of the car body 14, the shear beam load cell pins 22, summing box 26 and weigh instrument 27 are capable of sensing the weight of the ladle 12 and its contents which are supported upon the platform 15.

Mounted in the immediate proximity of each of the shear beam load cell pins 22 is a keeper assembly 40. More particularly, as shown in FIGS. 2-4, keeper assembly 40 is mounted along the outside surface of the outer wall 34 of the car body 14 immediately beneath the shear beam load cell pin 22. Keeper assembly 40 comprises a keeper plate 42 which is securely mounted by bolts 43 to the outer wall 34. The keeper plate 42 includes a pair of openings 44 each of which threadedly receives a jacking bolt 46. The ends of the jacking bolts 46 contact and engage the outer diameter of the shear beam load cell pin 22.

As a result of adverse loading conditions, the shear beam load cell pins of a transfer car have a tendency to shift or rotate. The rotation and subsequent misalignment of the shear beam load cell pins 22 causes the shear beam load cell pins 22 to provide erroneous readings which lead to incorrect weight measurements. Because of their circumferentially spaced contact with shear beam load cell pins 22, jacking bolts 46 serve to securely hold the shear beam load cell pins 22 in position and prevent the rotation thereof thereby helping to ensure accurate and consistent weight measurements.

Although in the preferred embodiment keeper assemblies 40 are mounted on the outer walls 34 of the car body 40 immediately beneath the shear beam load cell pins, it will be appreciated that the present invention contemplates the mounting of the keeper assemblies 40 in a variety of locations including, for example, along the top of the shear beam load cell pins 22 or upon the outside or inside surfaces of the outer wall 32 of the truck frame 20. Also, it will be appreciated that although preferably a pair of jacking bolts 46 are employed, it will be the present invention contemplates the use of any number of jacking bolts or similar fastening devices such as, for example, allen fittings or keys.

Figure 5:
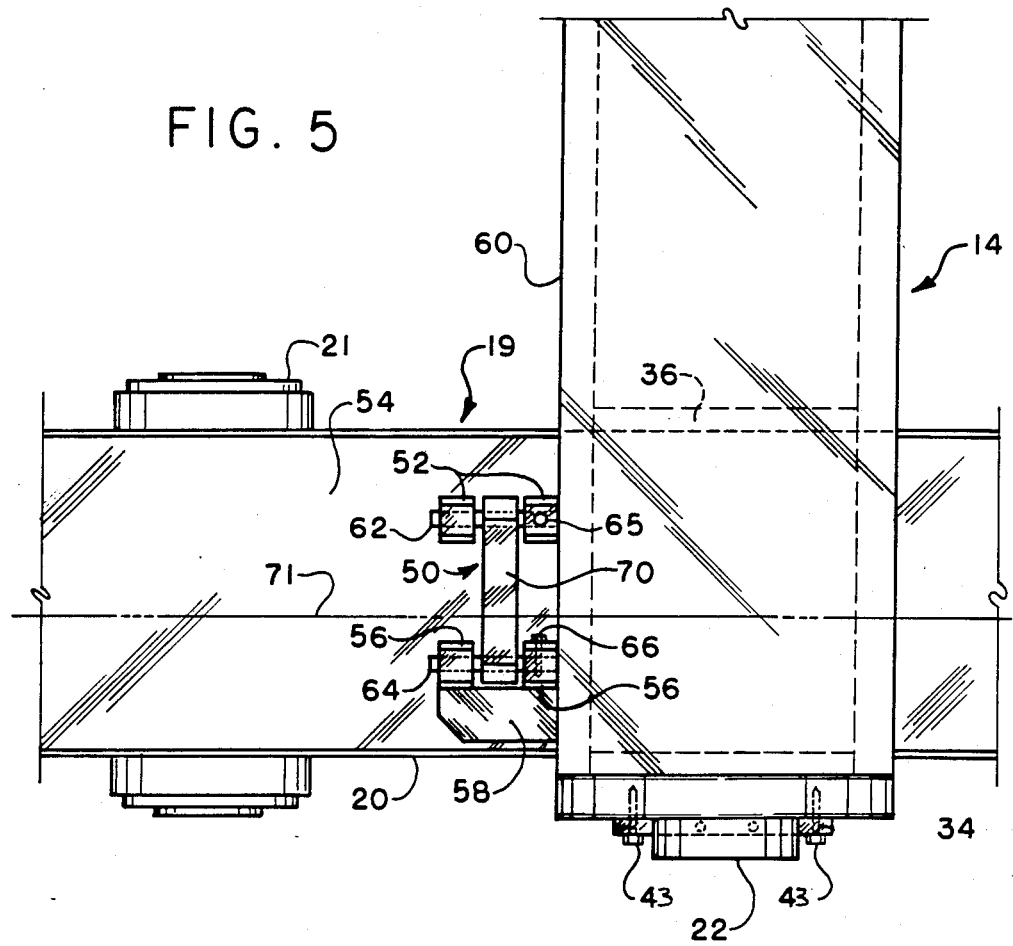
FIG. 5 is a fragmentary top plan view of the car body, shear beam load cell pin and truck assembly of FIG. 2.

Referring now to FIGS. 4 and 5, there is illustrated a stabilizer assembly, indicated generally at 50, for limiting the relative horizontal movement between the car body 14 and the truck assemblies 19. Stabilizer assembly 50 includes a pair of clevis forming gussets 52 mounted or welded on the top wall 54 of the truck frame 20 and a second pair of clevis forming gussets 56 mounted or welded on a pair of platforms 58 which extend from and are welded to the outside surface of a body end wall, illustrated as being the front wall 60 of the car body 14. Extending between each respective pair of gussets 52 and 56 are cylindrical pins 62 and 64. Pins 62 and 64 are removable and are respectively held in position within the eyes of gussetts 52 and 56 by bolts 65 and 66. Pivot arm 70 is pivotally connected at its respective ends to the pins 62 and 64. Pivot arm 70 extends substantially perpendicular to the major longitudinal axis 71 (shown in FIG. 5) of the truck assembly 19 and the rails 11. Pivot arm 70 includes eyes or openings at each of its ends which are of sufficient size to receive the pins 62 and 64 to allow the arm 70 to pivot therearound, but not too large in diameter so as to provide any excessive slop or run-out in the connections.

As a result of adverse loading conditions, the car body of a transfer car hs a tendency to shift and rub against the frames of the truck assemblies, the gap between the walls of the car body and truck frames sometimes being extremely narrow as a result of mill dirt accumulating therein. Stabilizer assemblies 50 permit the car body 14 to move vertically (as a result of any bending of the shear beam load cell pins 22 or the structural framework of the car body 14) relative to the truck assemblies 19 as a load, such as ladle 12, is placed on or removed from the car body 14. However, stabilizer assemblies 50 help to prevent the lateral or side-to-side horizontal movement of the car body 14 relative to the truck assemblies 19 when the car body 14 is subjected to a lateral load or a load which is perpendicular to the major axis 71 of the truck assemblies 19 or longitudinal length of the rails 11. Thus, stabilizer assemblies 50 serve to prevent the inner walls 30 and outer walls 32 of the truck frames 20 from respectively contacting or rubbing against the inner walls 36 and outer walls 34 of the car body 14. Frictional contact between the car body 14 and the truck assemblies 19 can cause the shear beam load cell pins 22 to produce erroneous readings which result in inaccurate and inconsistent weight measurements.

Preferably, stabilizer assemblies 50 are mounted in a location upon the transfer car 10 where they are somewhat protected. More particularly, as shown in FIG. 1, the stabilizer assemblies 50 are preferably mounted beneath the slag shields 16. Placing the stabilizer assemblies 50 in a semi-enclosed area such as beneath the slag shields 16 helps to protect the assemblies 50 from adverse environmental conditions (e.g., splashing molten metal or slag) thereby helping to ensure the proper operation of the stabilizer assemblies 50. However, it will be appreciated that a transfer car made in accordance with the present invention may include stabilizer assemblies 50 mounted in various locations upon the car including open non-enclosed areas.

Although in the preferred embodiment keeper assemblies 50 are illustrated in conjunction with shear beam load cell pins 22, it will be appreciated that the present invention contemplates the use of stabilizer assemblies 50 with transfer cars having standard or plain metal pins connecting the car body to the truck assemblies. Instead of shear beam load cell pins, such a transfer car may employ, for example, strain gauges for measuring the deflection of the framework of the car body and use such strain measurements to calculate the load placed on such transfer car.

A weighing system having keeper assemblies 40 and stabilizer assemblies 50 made in accordance with the present invention may also be installed upon a pre-existing ladle transfer car that may already be in service or operation. Therefore, the principles of the present invention are in no way restricted to use with new transfer cars for the various components of the stabilizer assemblies 5 and keeper assemblies 40 can be easily mounted upon a pre-existing transfer car. More particularly, once the car body 14 has been centered or properly aligned upon the truck assemblies 19 so as to ensure proper clearance between the car body 14 and truck assemblies, the gusset pairs 52 and 56 and the platforms 58 of the stabilizer assemblies 50 can respectively be welded to the car body 14 and truck assemblies 19, and the cylindrical pins 62, 64 and pivot arms 70 installed. The keeper assemblies 40 can easily be installed by bolting or welding the keeper plates 42 to the car body 14 in the immediate proximity of the shear beam load cell pins 22. The jacking bolts 46 can then be threaded into the keeper plate 42 until the ends of the bolts 46 contact and engage the outer diameter of the pins 22.

Although the invention has been shown and described with respect to a certain preferred embodiment, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A ladle transfer car for transporting a ladle and its contents along a surface and weighing such ladle and the contents thereof, said ladle transfer car including a car body for supporting such ladle and multiple truck assemblies for supporting said car body upon such surface and at least one load sensor for use in determining the weight of such ladle and the contents thereof, said at least one load cell sensor comprising a shear beam load cell pin connecting said car body to said truck assembly which is capable of sensing a load and transmitting an electrical signal for use in determining the weight of such ladle and its contents, each of said truck assemblies connected to said car body with a stabilizer assembly which limits the relative horizontal movement between each of said truck assemblies and said car body, said stabilizer assemblies each comprising a pivot arm extending substantially perpendicular to the major axis of said truck assemblies, said pivot arm pivotally connected at one end to said car body and pivotally connected at the other end to said respective truck assembly.

2. A ladle transfer car as set forth in claim 1 wherein said stabilizer assembly includes a first pair of gussets mounted on said car body and a pin extending between said first pair of gussets and pivotally connecting said one end of said pivot arm thereto, and a second pair of gussets mounted on said truck assembly and a pin extending between said second pair of gussets and pivotally connecting said other end of said pivot arm to said truck assembly.

3. A ladle transfer car as set forth in claim 2 including keeper assemblies for ensuring that said shear beam load cell pins do not rotate.

4. A ladle transfer car as set forth in claim 3 wherein said keeper assemblies are mounted on the car body in the immediate proximity of each of said shear beam load cell pins.

5. A ladle transfer car asset forth in claim 4 wherein said keeper assemblies comprise a keeper plate mounted upon said car body and a pair of jacking screws which are threadedly secured in said keeper plate and engage the outer diameters of said shear beam load cell pins.

6. A ladle transfer car for transporting a ladle and its contents along a surface and weighing such ladle and the contents thereof, said ladle car including a car body for supporting such ladle and multiple truck assemblies for supporting said car body upon such surface, each of said truck assemblies connected to said car body with a shear beam load cell pin, said car body including keeper assemblies mounted in the immediate proximity of each of said shear beam load cell pins, said keeper assemblies comprising a keeper plate mounted upon said transfer car and a pair of jacking screws which extend through said keeper plate and engage said shear beam load cell pin thereby ensuring that said shear beam load cell pin does not rotate.

7. A ladle transfer car as set forth in claim 6 wherein said keeper plate is mounted upon said car body immediately beneath said shear beam load cell pin.

8. A method for improving the weighing system of a ladle transfer car having a car body supported upon several truck assemblies and shear beam load cell pins connecting such truck assemblies to such car body comprising the steps of mounting one end of a stabilizer assembly having a pivot arm upon each of such truck assemblies and attaching the other end of such stabilizer assembly to such car body such that such pivot arm of such stabilizer assembly extends substantially perpendicular to the major axis of such truck assembly thereby allowing the vertical movement of such car body relative to such truck assembly and helping to prevent the lateral horizontal movement of such car body relative to such truck assembly.

9. A method as set forth in claim 8 further including the steps of mounting a keeper assembly in the immediate proximity of one of such shear beam load cell pins to help prevent the rotation of such shear beam load cell pin.

10. A method for improving the weighing system of a ladle transfer car having a car body supported upon several truck assemblies and shear beam load cell pins connecting such truck assemblies to such car body comprising the steps of mounting a keeper plate having a pair of threaded openings in the immediate proximity of one of such shear beam load cell pins, threading a jacking bolt through each of such threaded openings in such keeper plate and tightening such jacking bolts against the outside diameter of such shear beam load cell pins until such jacking bolts contact and securely engage the outer diameter of such shear beam load cell pin thereby preventing the misalignment or rotation of such shear beam load cell pin.

11. A ladle transfer car for transporting a ladle and its contents and weighing such ladle and the contents thereof, said ladle transfer car comprising a car body for supporting such ladle and multiple truck assemblies supporting said car body, each of said truck assemblies connected to said car body with a pin and stabilizer means for preventing lateral horizontal movement between said car body and said truck assembly and thus frictional engagement of said car body with said truck assembly, said truck assemblies further including keeper means for preventing the rotational movement and misalignment of said pins.

12. A ladle transfer car for transporting a ladle and its contents and weighing such ladle and the contents thereof, said ladle transfer car comprising a car body for supporting such ladle and multiple truck assemblies supporting said car body, each of said truck assemblies connected to said car body with a pin and keeper means for preventing the rotational movement and misalignment of said pin.

* * * * *

UNITED STATES PATENT AND TRADEMARK OFFICE
CERTIFICATE OF CORRECTION

PATENT NO.   : 4,878,551

DATED        : November 7, 1989

INVENTOR(S)  : Donald M. Watkins, et al.

It is certified that error appears in the above-identified patent and that said Letters Patent is hereby corrected as shown below:

Col. 7, claim 5, line 14, change "asset" to --as set--.

Signed and Sealed this

Twentieth Day of November, 1990

Attest:

HARRY F. MANBECK, JR.

*Attesting Officer*    *Commissioner of Patents and Trademarks*